Sept. 9, 1958  H. W. SNYDER  2,851,650
NON-LINEAR VELOCITY SERVOSYSTEM AND GENERATOR
Filed June 18, 1954
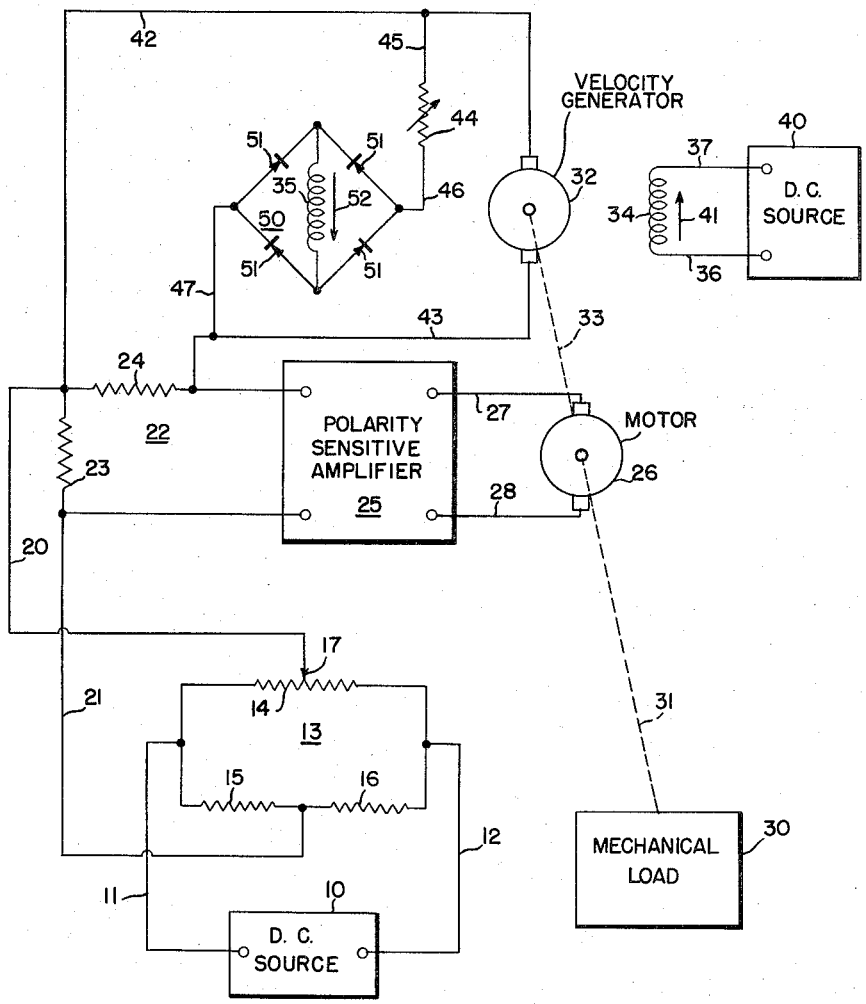
INVENTOR
HENRY W. SNYDER
BY *George H Fisher*
ATTORNEY

United States Patent Office 2,851,650
Patented Sept. 9, 1958

2,851,650

NON-LINEAR VELOCITY SERVOSYSTEM AND GENERATOR

Henry W. Snyder, Bloomington, Minn., assignor to Minneapolis-Honeywell Regulator Company, Minneapolis, Minn., a corporation of Delaware Application June 18, 1954, Serial No. 437,844

5 Claims. (Cl. 318—327)

The present invention relates to a speed control system and more particularly to a generator which provides a non-linear voltage output to be used to attain speed control in a novel manner.

It has been common practice to use the output of a linear velocity generator as feedback in a motor control circuit for stabilization and speed control. This type of feedback is proportional to speed and is undesirable in control of certain types of systems, such as tank or aircraft turret control systems. It has been found that these systems would be more useful if the voltage fed back from the velocity generator were proportional only at low speeds and non-linear with respect to input at high speeds. In other words, when a gunner is tracking a target at slow speeds it is desirable to have a maximum of stability and control. When, however, he is operating at high or "slew" speeds while moving his aim rapidly from one target to another the characteristic of non-linear feedback is desirable in that a reduction in feedback is obtained over that which would be present in the case of a conventional linear velocity generator. This reduction in feedback allows a more rapid adjustment of the turret position.

It is an object of this invention to provide a speed control system utilizing a generated, non-linear voltage feedback to provide a controlled non-linear speed output.

Another object of this invention is to provide a novel means of obtaining a non-linear voltage output from a type of device which normally is used as a linear voltage source.

Still another object of this invention is to provide a speed control system utilizing a generated non-linear voltage, whose linearity can readily be adjusted or controlled to provide the type of speed control desired.

Still further objects of this invention will become apparent from the reading of the attached specification and drawing.

The single figure of the drawing illustrates a preferred modification of my invention.

Referring to the drawing it will be seen that a direct current source 10 supplies power through conductors 11 and 12 to a resistive bridge circuit 13 which is composed of a potentiometer 14 and resistors 15 and 16. The wiper 17 of the potentiometer 14 and the junction of resistors 15 and 16 are connected by conductors 20 and 21 across resistor 23 of the resistive network 22. The resistive network 22 also contains resistor 24 in series with resistor 23 and the network forms the input circuit to the polarity sensitive amplifier 25. The output of the amplifier 25 is supplied to the speed controlled motor 26 through conductors 27 and 28. The motor 26 drives a mechanical load 30 by means of any convenient coupling means and is shown as dash lines at 31. The motor 26 also drives the velocity generator 32 by means of any convenient coupling shown as dash lines at 33. It is understood that coupling means 31 and 33 could be the same shaft or separate shafts related by any form of gears or coupling means that were mechanically convenient.

The physical structure of the velocity generator 32 may be of any usual form but it is novel in that it contains two field windings 34 and 35. Field winding 34 is connected by conductors 36 and 37 to a direct current source 40. The direct current source 40 in combination with conductors 36 and 37 and winding 34 provide the velocity generator with a source of constant flux as represented by arrow 41. It is understood that source 40 and source 10 could be the same, or that source 40, conductors 36 and 37, and winding 34 could be replaced by any unit such as a permanent magnet, which would supply a constant flux as represented by arrow 41.

The output of the velocity generator 32 is connected across resistor 24 by means of conductors 42 and 43 and is of a non-linear nature as will be explained below. Also connected between conductors 42 and 43 by means of leads 45, 46 and 47, is a series combination of a rheostat 44 and bridge circuit 50. The bridge circuit consists of the self-excited field winding 35 and four rectifiers 51 connected in such a manner as to provide current flow in the winding 35 always in one direction so that the resulting flux is always in one direction as indicated by arrow 52. It is understood that flux 41 and flux 52 may be opposite for degenerative feedback or in the same direction for regenerative feedback depending upon the type of speed control desired, and that once established, the direction is independent of the direction of rotation of the rotor of the velocity generator 32. Also, it is understood that the rectifier bridge 50 could be replaced by any means, such as switches, which would allow unidirectional flux for self-exciting winding 35.

The operation of the system is such that as the rotor of the velocity generator 32 is rotated by the motor 26 through coupling 33, the output to conductors 42 and 43 tends to be proportional to the speed of rotation because of the constant flux 41. This output energizes the series circuit of the rheostat 44 and bridge circuit 50 and causes a flux 52 to be produced in winding 35. In the example described the flux 41 and flux 52 oppose and the effect of the flux 52 can be controlled by the amount of current allowed to flow in the self-excited winding 35. A rheostat 44 has been illustrated as one simple means of controlling self-excited current flow in the winding 35, but it is understood that any type of current control device could be used. It is further understood that the term current control device refers to a device capable of introducing additional current signals as well as limiting current generated by the velocity generator 32. Under the condition described the combination of flux 41 and flux 52 of the velocity generator 32 will supply a non-linear voltage. This output voltage does not increase linearly with speed but tends to become a constant value at a predetermined rotational speed. This non-linear, degenerative voltage is fed back to the input of the amplifier 25 by conductors 42 and 43 and applied across resistor 24. This feedback allows the system to operate in almost a linear manner at low speeds and rapidly decreases the feedback effects at high speeds.

In considering this invention it should be kept in mind that this disclosure is intended to be illustrative only and the scope of the invention is to be determined only by the appended claims.

I claim as my invention:

1. In a system of the class described, in combination, a source of direct current, a resistive bridge energized from said direct current source, a resistive network connected by electrical means to the resistive bridge, a polarity sensitive amplifier controllably energized by electrical means from the resistive network, a direct current motor energized by the amplifier, a coupled mechanical load, a driven direct current generator including a first winding excited from the direct current source and a second shunt winding, a rheostat, and a rectifier bridge; said generator being excited by the first and second windings with said second shunt winding electrically connected in series with the rheostat and the rectifier bridge so said second shunt winding is always differentially energized; said generator being electrically connected to the resistive network at the input to the polarity sensitive amplifier.

2. In a system of the class described, in combination, a direct current source, a control means, an amplifier controllably connected to said control means, a motor energized by the amplifier, a coupled mechanical load, a driven direct current generator including a first winding excited from the direct current source and a second shunt winding, a rheostat, and a rectifier bridge; said generator being excited by the first and second windings with said second shunt winding electrically connected in series with the rheostat and the rectifier bridge so said second shunt winding is always differentially energized; said generator being electrically connected to the input of the amplifier.

3. In a system of the class described, in combination, a direct current source, a control means, an amplifier controllably connected to said control means, a motor energized by the amplifier, a coupled mechanical load, a driven direct current generator including a first winding excited from the direct current source and a second shunt winding, a resistance, and a current control means; said generator being excited by the first and second windings with said second shunt winding electrically connected in series with the resistance and controlled by said current control means so said second shunt winding is always differentially energized; said generator being electrically connected to the input of the amplifier.

4. In a system of the class described, in combination, a control means, an amplifier controllably connected to said control means, a motor energized by the amplifier, a coupled mechanical load, a driven direct current generator including a constant flux source and a shunt winding, a resistance, and a current control means; said generator being excited by the constant flux source and the shunt winding with said shunt winding electrically connected in series with the resistance and controlled by the current control means so said shunt winding is always differentially energized; said generator being electrically connected to the input of the amplifier.

5. In combination, a direct current generator, a direct current source of constant magnitude, a first winding energized from said source, a second shunt winding, and a current control means; said generator being excited by the first and second windings with said second shunt winding electrically connected in series with and being controlled by said control means so said secondary shunt winding is always differentially energized to provide a non-linear output voltage.

References Cited in the file of this patent

UNITED STATES PATENTS

| | | |
|---|---|---|
| 1,884,902 | Spencer | Oct. 25, 1932 |
| 1,952,936 | Murakami | Mar. 27, 1934 |
| 2,297,350 | Fisher | Sept. 29, 1942 |
| 2,674,708 | Husted | Apr. 6, 1954 |
| 2,695,982 | Soller et al. | Nov. 30, 1954 |

FOREIGN PATENTS

| | | |
|---|---|---|
| 358,083 | Great Britain | Dec. 2, 1931 |
| 678,520 | Great Britain | Sept. 3, 1952 |